United States Patent [19]

Barham et al.

[11] 3,852,498

[45] Dec. 3, 1974

[54] METHOD FOR SORPTION OF UREA BY WHOLE CEREAL GRAINS

[76] Inventors: Harold N. Barham, 3205 46th St.; Harold N. Barham, Jr., 3035 57th St., both of Lubbock, Tex. 79413

[22] Filed: Oct. 19, 1972

[21] Appl. No.: 298,820

[52] U.S. Cl.................. 426/69, 426/289, 426/462, 426/507, 426/807
[51] Int. Cl............................................... A23k 1/22
[58] Field of Search ............. 426/69, 289, 309, 442, 426/455, 456, 459, 462, 507, 807, 28, 44, 52, 53, 295, 2, 290

[56] References Cited
UNITED STATES PATENTS 2,965,488   12/1960   Belasco ................................ 426/69
3,642,489   2/1972   Bartley ................................. 426/69

Primary Examiner—Norman Yudkoff
Assistant Examiner—Curtis P. Ribando
Attorney, Agent, or Firm—Sheridan, Ross & Fields

[57] ABSTRACT

A method for sorption of urea into the tissues of whole cereal grain kernels to supplement the nitrogen content of grains primarily for animal feeding purposes, the method comprising the addition of water to and adsorption by the grain, followed by the addition of powdered urea to and sorbtion by the intact cereal grain kernel tissues.

5 Claims, No Drawings

METHOD FOR SORPTION OF UREA BY WHOLE CEREAL GRAINS

SUMMARY OF THE INVENTION

This invention relates to a basic method to sorb urea into the various tissues of whole cereal grain berries to provide a product consisting of intact whole cereal kernels with sufficient nonprotein nitrogen to increase the total equivalent protein content to at least that amount contained in oil seed protein concentrates. The present invention especially relates to a process to increase the total nitrogen content, and therefore total equivalent protein content, in intact seeds for the feeding of ruminant animals.

BACKGROUND OF THE INVENTION

Optimum total feed protein content for ruminant animals in feedlot operations varies from about 10.5 to 12.5 percent. Since the natural protein content of the principal feed grains, corn and grain sorghum, usually varies from about eight to ten percent, it is necessary to supplement that protein. The use of economical nonprotein nitrogen (NPN) compounds as augmentation for natural protein nitrogen in ruminant feeds has been known and practiced for generations. Moreover, such practice has been increasing both in absolute and relative terms. However, regardless of the efficacy of NPN usage, a number of problems are inherent in the usage thereof, and which must be solved before NPN consumption may be materially increased or employed with greater safety and increased efficiency in the present context. Since NPN compounds, principally urea, are obviously and intimately related to other feedstuffs in the cattle fattening rations, all of these facets must be considered simultaneously to place the efficacy of urea incorporation into cereal grains in appropriate perspective.

The complex physical nature of whole cereal seeds is such that the polymeric interrelationships of component tissues sharply inhibit availability of all the polymers. Further, these relationships involve polar and nonpolar areas in which an imbalance of vector forces produce a metastable condition such that the net forces attempt to reach maximum stability. All of the internal structure of the kernel is sterically terminated and enclosed by the pericarp, also composed of various polymer types, and whose avenues of molecular entry are sharply limited.

To cope with such interpolymeric inhibitions, processes to utilize cereal grains have necessarily involved physical disruption of these forces by comminution; i.e., by fracturing the intact condition of the individual berries. By so doing, internal tissues and polymers may be exposed, to a limited degree, for much greater accessibility. Such is the case for industrial utilization to provide products for food and other uses. Similarly, such treatment is required to prepare whole cereal grains for animal feeding with the degree and type of comminution dependent upon the digestive resources of the fed animal.

In attempts to treat the whole cereal grains, either preparatory to various comminution processes or to add nutritive materials to the berries, chemical solutions have been used and is an old art. Because of the polar areas of the kernel, the highly polar nature of water, the propensity of water soluble compounds, and the unique acceptability of water by animals, water has been the only solvent which may be seriously considered. However, numerous problems are involved in chemical treatment of whole grain which prevent the widespread use logically expected.

Many chemicals in water solutions are sorbed sparingly, with difficulty, or in the outer regions only of the whole cereal kernels. In any case, adsorption of chemicals from aqueous solutions is nonuniform. Steepants of all types, for example, vary in degree of suitability due to nonuniform swelling, various degrees of nonuniformity of chemical sorption, and are relatively expensive to use because of costs of addition and removal of water used in large quantities. Rigid economics rule out such possible procedures to prepare grain for animal feeding, aside from the doubtful efficacy. The additions of solutions to whole grain, such as sodium chloride, by way of example, results in quite limited quantities of the salt sorbed and that amount is sorbed by the pericarp only, as shown by its easy removal by elutriation. Solutions of reactive reagents, such as sodium hydroxide, are inappropriate because of reaction at the sites of sorption, concordant swelling, and prevention of further adsorption. Solutions of urea may be adsorbed by whole cereal grains but with difficulties sufficiently serious as to prevent commercial use of such application. The primary difficulty is encountered upon mixing normal whole cereal kernels with urea solution whereby the initial swelling of the pericarp greatly retards further adsorption, leaving most of the solution free to cause a softening of the pericarp polymers. The result is a sticky mass resembling grain and thick molasses, a condition which may persist over a period of several days, or longer, and renders the procedure commercially impractical. It is well known that urea functions to soften cellulose and is used in the paper industry for that purpose. It is apparent that seed softening compounds the difficulties encountered in sorption of an aqueous urea solution.

A commonly accepted understanding regarding the use of NPN compounds, among those skilled in the art, is its use at a level not to exceed one-third of the total nitrogen requirement, although rations with nearly complete nitrogen replacement by NPN has been demonstrated as successful under carefully controlled circumstances. Immediately after entering the rumen, urea is very rapidly hydrolyzed to ammonia and carbon dioxide. The ammonia, in turn, is utilized by operative rumen microflora to build cellular protein and multiply, thus producing protein. The newly produced microorganisms pass into the subsequent portions of the digestive system where they are digested and from which they are adsorbed and assimilated by the animal.

Nutritionists are in general agreement that nonruminant animals require nonprotein nitrogen, but the amount of such nitrogen required, the method of metabolism, and other pertinent factors, apparently are not clearly understood. However, it is known that at least a small portion of the total protein requirement for poultry, for example, can be replaced by the judicious use of certain NPN compounds such as ammonium citrate. Others have proposed the use of urea for such requirements for nitrogen substitution.

As noted, the use of NPN compounds in conjunction with ruminant animal feeding has increased. For several reasons, urea is the most commonly used NPN compound for this purpose. Of paramount importance is the high nitrogen content, usually about 42 to 46 percent in the available feed grade product, which allows the use of low percentages in a straight ration. Perhaps at least as important is the price disparity between oil seed protein and urea with the former priced seven to ten times the latter, on a nitrogen basis. Compared to other NPN compounds, urea does not include other limiting elements such as phosphorous in $NH_4H_2PO_4$, or sulfur in $(NH_4)_2SO_4$, which limit the allowed nitrogen by limits on the phosphorous or sulfur permitted or desirable. These and other advantages clearly point to the utility of the use of urea.

Perhaps not so apparent are the problems encountered in the usage of urea as a partial substitute for protein nitrogen. For several reasons, care must be taken in application of urea to ruminant animal feeds. Urea is not palatable, but, more importantly, an excess of urea may be very toxic to the fed animal by exceeding the ammonia threshold in the bloodstream. Such excess is commonly referred to as "urea toxicity," a malady further compounded by the very high rate of availability of ammonia from urea which is grossly out of phase with the relatively slow availability of other nutrients such as those organic polymers of cereal seeds. For this reason, efficiency of urea nitrogen utilization is generally conceded by nutritionists to be less than that for protein nitrogen, a proposition which detracts from the advantageous price position of urea.

A common practice in large cattle feeding operations is to "side dress," or sprinkle, the urea on top of the prepared feed in the bunkers. Usually, the term "prepared feed" means grain which has been steam rolled, micronized, dry rolled, and the like, and to which other ingredients have been added. The other ingredients are comprised of salts of micronutrients, trace nutrients and minerals, fat, and roughage, usually five to 20 percent of the total ration. Also, mixing of the urea with the freshly rolled feed grains and roughage has been extensively used. However, with the former the application is inherently nonuniform, and lack of uniformity in the latter is observed due to separation and stratification because of extreme dissimilarity in size, shape and types of entities which make up the total feed ration. Some operators spray liquid feed supplements, containing dissolved urea and other nutrients, on the flanked grain. By so doing, urea separation may be overcome but uniform distribution within the scope of the procedure is suspect due to reluctance by the operator to thoroughly mix in order to avoid damage to the tender flakes which tend to produce undesirable fines. Occasionally, liquid feed supplements are provided separately for animals to be fed free choice. The primary use of such supplements is in connection with open range feeding rather than with feeding high energy rations in feedlot confinement.

One process, designed to overcome the uniformity and rate of availability shortcomings, involves condensation of urea with whole grain components. In order to provide maximum endosperm exposure, for reasons set forth above, the whole grain is finely ground, mixed with the desired amount of water and urea, and simultaneously cooked and extruded so as to condense the urea to the gelatinized starch, then dried and reduced to particles of appropriate size. According to that method, a product may be produced which contains sufficient nitrogen to be equivalent to 24 to 44 percent protein (N × 6.25 = protein), and whose upper range approximates the actual protein content of oil seed protein concentrates (about 40 to 50 percent). The principal shortcomings of the process are the relatively low product throughout and adverse power requirements for extrusion which combine to result in total costs which detract from the price advantages of urea. Nevertheless, such processing clearly demonstrates the conviction, by those in the art, for the need to utilize urea in ruminant nutrition in a manner designed to incorporate efficiency, safety and economy.

From the foregoing it can be seen that the most serious problems associated with present use of urea supplement to grain adversely counter balancing the obvious cost advantage inherent in urea utilization are the relatively high rate of urea derived ammonia availability to the animal, low efficiency of utilization of urea by the animal, and nonuniformity of application of the urea to the grain. It would be immediately obvious to those skilled in the art that an economical method of incorporation of urea within the whole intact cereal berry, thereby avoiding the necessity of comminution, and which would result in uniform sorption, and reduce the rate of availability of NPN to the fed animal, would be a significant improvement over the present art.

OBJECTS OF THE INVENTION

It is therefore an object of this invention to provide a method of sorption of urea into intact cereal grain kernels in a manner which precludes its resolution and separation from these kernels.

Another object of this invention is to provide a method of sorption of urea by intact cereal kernels to preclude the necessity for comminution of those kernels.

A further objective of this invention is to provide a method for urea sorption by the internal structure of intact cereal grain seeds which allows for subsequent removal of the water used.

Still another objective of this invention is the provision of a method for sorption of urea into the gross structure of intact whole cereal grain kernels in preparation for subsequent superimposed heat processes suitable to cause extensive condensation of the urea with tissue polymers therein.

A further objective of this invention is to provide a method for rapid urea sorption by cereal grain tissues which exhibits exceptional economy and simplicity.

Yet another objective of this invention is the provision of a method of urea sorption into intact whole cereal grain berries in amounts which vary up to that required for total protein equivalency of products known as oil seed protein concentrates.

Other and further objectives will be apparent from the examples and explanations which follow.

STATEMENT OF THE INVENTION

The attainment of the foregoing objectives, features and advantages is based on the discovery that intact whole cereal grains sorb essentially anhydrous powdered urea when the moisture content of such whole seeds has been increased to a level somewhat greater than the maximum considered to be a normal storeable level, about 13 percent. Accordingly, the invention comprises sorbing up to about 58 percent by weight of urea into raw whole grain by contacting with urea a grain having a moisture content from about 14 to 25 percent. The grain is ordinarily treated with water prior to contact with urea to raise its moisture content to the required level.

DETAILED DESCRIPTION OF THE INVENTION

By the addition of water to the intact whole cereal grains in quantities which exceed that which is normally held and which is materially less than saturation, the solvent may be appropriately located in the cereal grain tissues separate from and prior to sorption of the urea. In this manner, the congestion resulting from contact between solution and whole kernels, with the concomitant grevious handling problems, are avoided.

From the aforegoing it is apparent that the water content of the grain, as to amount and location within the whole intact berry, is of paramount importance to the process mechanisms. Considering the full range of water content from bone dry to saturation, the water involved in low moisture levels is very tightly bound with a signficant portion considered to be bound by primary bonding, while that at the high end of the spectrum is loosely adsorbed. Between those extremes water is held by forces of varying degree although the exact water holding mechanisms at all levels cannot be accurately defined. With moisture at the "as is" level, or that normally occurring in mature seeds (11 to 13 percent), the water is adsorbed with sufficient tenacity to preclude the freedom required for simple water translocation within the seed and explains why such seeds do not respire or germinate. Also explained is the reason why powdered urea is sorbed only in very small quantities by normal intact seeds, and usually is not sorbed at all. Water adsorbed in excess of that normal level is generally free to translocate. The rate of adsorption of water by "as is" moisture whole cereal seeds is rapid initially, then decreases abruptly as saturation is approached.

With a reservoir or tissue-associated water in intact cereal kernels whose moisture content is somewhat above that of normal grain, and in combination with the imbalance of vector forces, urea is transported into the extremities of the tissue structure of the whole seed. It is believed that the water thus associated with the tissues may associate with urea molecules, and together respond to the net imbalance of vector forces in the movement of urea into the kernel tissues; thus, in the process the water is reused. The net imbalance of vector forces to pull the urea into the cereal berry tissues are strong, and provide an inherent source of energy necessary for process efficacy. The precise mechanism to explain the relationship of available water, urea and the vector forces is not clearly understood in detail, but does point to the unexpectedness of the invention. Initially, the rates of disappearance of urea are high, followed by decreased rates of disappearance as water availability is decreased. Such mechanism provides for the sorption of urea into whole cereal berries in quantities which are significantly in excess of that which are soluble in the added water alone. Furthermore, the ability to sorb large quantities of urea into the intact seed obviously precludes urea sorption exclusively in the outer regions of the seeds.

The amount of water to be adsorbed into the grain in advance of urea sorption varies according to the physical characteristics of the grain and the amount of urea to be sorbed, and is related to the time lapse between addition of water and addition of urea. It is well known that there is as much or more variance among different lots of the same grain as there is among lots of grain of different types as measured by some criteria, such as moisture adsorption and moisture content within the range considered to be normal. Generally, the quantities of water to be added are not extremely critical, and such characteristics and requirements may be readily ascertained prior to processing large lots of grain. If small amounts of urea are to be incorporated, only a small amount of water need be added to the grain, and the tempering time, or time allotted for water adsorption, must be relatively short to ensure proper water location. In that case, proper water location means an essentially dry berry surface but water should be located near the surface. For low urea quantities, water tolerance is high and is effective with moisture contents near saturation. If the amount of urea to be sorbed is high, the quantity of water to be sorbed is higher, though not proportionally higher, and the tempering time must be longer, consistent with time requirements to attain distribution of larger quantities of water. In general, the water content must be greater than that normally present in storeable cereal kernels, but somewhat less than saturation. More specifically, a moisture content range of about 14 to about 25 percent is usually optimum. The ratio of water added, or that in excess of that normally present in storeable seeds, to urea added varies from about 3:1 to about 1:3.

Although the particle size of urea crystals used has varied greatly, it has been observed that very large crystals of particles, are too large to be operative because of excessive time for urea sorption and moisture content requirements. As a result, it is necessary to grind such particles to those which are smaller than 420 microns, or that which will pass through a U.S. Standard 40 screen. Although ground crystals tend to reagglomerate, it has been found that such agglomerates are still operative.

In practical application of the invention, the water used never exceeds that amount required for the planned operation, consistent with subsequent costs of removal, when required, or impairment of efficiency due to spatial requirements by unnecessary water. Due to deficient spatial accommodations, excessive sorbed water may result in water forced to the kernel peripheries as urea is pulled into the internal structure.

Necessity for water removal, following urea sorption, varies as determined by several factors. Frequently, when adding only small amounts of water and urea, to provide the protein equivalency of a straight grain cattle fattening ration, the water need not be removed at all. Such slightly increased moisture levels are believed to be beneficial in context with feedlot grain processing wherein heat is used in some fashion in the majority of these operations. Heat is inherent in steam flaking, the chief processing method in large feedlots, and in "micronizing," a process in which the grain is heated by energy of the infrared spectrum, and then immediately followed by rolling into flakes. It is believed that significant condensation of urea with internal grain polymers takes place in both processes, thus ensuring controlled urea release in the fed animal. Thus, the product is produced in a form to utilize the heating processes already in use for ruminant feed ration preparation, an additional improvement.

When sufficient water and urea have been sorbed into the intact kernels to provide a product with a total protein equivalence equal to or greater than that of a protein concentrate, some water removal is usually desirable subsequent to urea sorption. Moderate delay in moisture reduction is desirable to allow for distribution within the whole berries, but the time required is insufficient for grain spoilage. Only a part of that added water need be removed, and that may be accomplished economically and quickly by any of a number of methods commonly in use. Additionally, removal of that water eliminates some water shipment and increases further the protein equivalency.

From the proceeding discussion it is apparent that the method of the present invention is such that equipment presently in use, or economically and readily available, may be utilized due to flexibility, simplicity, and high rates of production inherent in the process. Moreover, the products produced therefrom fit into marketing, transport, and feedlot processing methods already in use for whole cereal grain.

As used herein the terms "whole seeds" or "grains" refers to all intact whole cereal grains and include barley, corn, grain, sorghum, millet, oats, rice, rye, triticale, wheat, and other grains for which the term "cereals" or "cereal grains" is generic. It also includes lots of grains composed primarily of whole kernels of a single type, or mixed types, varieties, hybrids, and the like. The term "sorption" includes adsorption or absorption, or both, and is used interchangeably with "encapsulation" or "incorporation."

In all but one of the examples listed a one-pint glass jar with a metal screw-type gasketed lid was used; in the one instance an all-steel mixer with a gasketed lid was used. Grain, water and urea each were weighed into the container and mixed after additions were made. Usage of the hermetically sealed glass container afforded excellent visual observation and, therefore, proof of urea sorption by the whole seeds since the glass and metal could adsorb none of the materials used. In addition to visual evidence, and that shown by weight changes, total nitrogen was determined on the ground samples by the standard Kjeldahl method. Total nitrogen was multiplied by a factor of 6.25 and reported as total equivalent protein, a well standardized practice in the animal feeding industry. Calculated protein equivalents were based on average protein content for the type grain used in the examples, in addition to the added urea protein equivalent. The minor disparity between calculated and determined protein was due to difference between assumed and actual grain protein, standard error in the Kjeldahl determination, the error inherent in moisture determinations upon which the protein calculations were based, and variance between laboratories.

In one example, urea NPN was determined using the Association of Official Analytical Chemists method whereby the ground samples were reacted with urease, then distilled, collected and measured. The same samples were also analyzed for total nitrogen from all sources by the Kjeldahl method for comparative purposes.

Treated whole kernels in all of the examples were selected at random, then cut in halves, some laterally and some longitudinally, to facilitate visual observation of changes in endosperm uniformity as compared to untreated seeds. The endosperm of the principal feed grains are almost always nonuniform, as pointed out. An increase in uniformity toward homogeniety, and a decrease in differentiation between the "floury" and "corneous" endosperm, is known to provide increased tissue availability for the ultimate use. A significant increase in uniformity was observed in all of the examples tested. In no instance were urea crystals in evidence in the sectioned kernels. Also, the treated seeds containing high quantities of urea were notably bland to the taste, exhibiting a strong tendency to mask the pronounced sharp taste sensation of urea. Low amounts of urea sorbed into cereal kernels in the examples could not be detected organoleptically at all.

In the tables listing the examples, all weights are in grams or pounds, as designated, and percentages are based on grain dry weight. Figures in parentheses, following urea or water additions, indicate the time lapsed after the next previous addition, with letters such as $m$, $h$ and $d$ indicating minutes, hours and days. Numbers in parentheses preceeding the listed weights of urea and water used indicate the order of application. The observed maximum times for disappearance of urea are conservative and actual times are usually less than those listed. The 90 percent disappearances are conservative estimates because actual measurements during sorption were not possible for reasons which are apparent.

The following specific examples are given to illustrate various features of the present invention and are not to be regarded as limitations thereof, many variations of which are possible within the scope of the invention.

EXAMPLES

| Ex. No. | Grain used, Amt & Mst | Water used, Order, Amt & New Mst. 90% of urea | Urea added, order Amount (wt & %) & time interval of urea | Observed Maximum Time for Disappearance of at least (%) | All (%) | Total Equivalent Protein Content calc'd (%) | actual | Subsequent Treatment, if any | Final Product moisture |
|---|---|---|---|---|---|---|---|---|---|
| 1 | Corn 151.0g at 11.7% | (1) 1.9g (12.8%) | (2) 1.5g (1.125%) (5m) | 1 min | 1 min | 11.97 | 13.67 | Exposure to infrared heat—42 sec. | 7.0 |
| 2 | Grain Sorghum 15.0% | (None) | (1) 1.5g (1.125%) | 5 mins | 45 mins | 12.02 | 13.26 | | 15.0 |
| 3 | Grain Sorghum 153.1g at 12.9% | (1) 9.9g (18.2%) (3) 2.0g (19.2%) (30 (19.2%) h) | (2) 25 g (18.75%) | (2) 1 min (3) 1 min | —50.17 (3) 1 min | 47.70 | 10.4 | | |
| 4 | Barley 149.7g at 11.0% | (1) 17.0g (20.00%) | (2) 25 g (18.75%) (6h) | 5 mins | 30 mins | 50.47 | 54.74 | | 9.1 |

EXAMPLES—Continued

| Ex. No. | Grain used, Amt & Mst | Water used, Order, Amt & New Mst. 90% of urea | Urea added, order Amount (wt & %) & time interval of urea | Observed Maximum Time for Disappearance of at least (%) | Observed Maximum Time for Disappearance of All (%) | Total Equivalent Protein Content calc'd (%) | Total Equivalent Protein Content actual | Subsequent Treatment, if any | Final Product moisture |
|---|---|---|---|---|---|---|---|---|---|
| 5 | Corn 151.1g at 11.7% | (1) 15.6g (20.00%) | (2) 25 g (18.75%) (6h) | 5 mins | 1.5 hrs | 49.15 | 46.77 | | 10.9 |
| 6 | Grain Sorghum 153.1g at 12.9% | (1) 13.6g (20.00%) | (2) 25g (18.75%) (6 h) | 5 mins | 1.5 hrs | 50.07 | 50.73 | | 10.3 |
| 7 | Oats 148.0g at 9.9% | (1) 18.7g (20.00%) | (2) 25g (18.75%) (6 h) | 5 mins | 1.0 hr | 52.39 | 54.59 | | 9.1 |
| 8 | Rice 145.7g at 8.5% | (1) 21.0g (20.00%) | (2) 25 g (18.75%) (6h) | 5 mins | 1.0 hr | 50.40 | 49.60 | | 5.6 |
| 9 | Rye 149.0g at 10.5% | (1) 17.7g (20.00%) | (2) 25g (18.75%) (6h) | 5 min | 2 hrs | 52.25 | 54.33 | | 9.1 |
| 10 | Triticale 145.1g at 8.1% | (1) 21.6g (20.00%) | (2) 25 g (18.75%) (6h) | 5 mins | 30 mins | 52.78 | 55.61 | | 8.6 |
| 11 | Wheat 147.8g at 9.8% | (1) 18.9g (20.00%) | (2) 25 g (18.75%) (6h) | 5 mins | 1 hr. | 53.02 | 50.03 | | 9.5 |
| 12 | Corn 151.1g at 11.7% | (1) 11.9g (18.00%) | (2) 20g (15.0%) (2h) | 1 min | 30 mins | 41.84 | 42.41 | | 10.7 |
| 13 | Corn 151.1g at 11.7% | (1) 11.9g (18.00%) | (2) 25g (18.75%) (2h) | 10 mins | 1.5 hrs | 49.29 | 48.32 | | 10.6 |
| 14 | Corn 151.7g at 12.1% | (1) 11.3g (18.00%) | (2) 20g (15.00%) (2h) | 1 min | 30 mins | 42.35 | 42.71 | | 10.2 |
| 15 | Grain Sorghum 199.7 lbs. at 12.9% | (1) 2.554 lbs (14.00%) | (2) 2.0184 lbs (1.16%) (5m) | 40 secs. | 3 mins | 12.74 | 12.76 | Micronized | 8.0 |

In Example 1, sufficient urea, 1.125 percent based on the grain dry weight, was sorbed quickly by whole corn to increase the apparent protein content to 11.97 percent, sufficient for a straight grain cattle fattening ration, satisfying the total nitrogen requirement. Actual measured protein was 13.67 percent. Kernels sectioned, following the infrared heat treatment, revealed an endosperm uniformity further improved over that observed following urea sorption.

In Example 2, wherein freshly harvested grain sorghum with 15 percent moisture was used, no water was added. The incidence of grain with water appropriately located within the inner tissue structure is very low. Further, the 15 percent moisture level is regarded as too high for safekeeping and would usually be reduced to a lower moisture level within a very short time after delivery. However, it was found that some grains with different histories but the same moisture level, with adequate time for uniform moisture distribution within the kernels, do not sorb powdered urea.

The procedure used in Example 3 illustrates the remedial action to be used in the event the water originally added proves to be insufficient to facilitate sorption of all of the subsequently added urea. Most of the 25 grams of urea was sorbed rapidly, but a small proportion of the urea was not sorbed. Thirty hours after the urea had been added, two grams of water was added to the treated grain, increasing the total moisture from 18.2 to 19.2 percent and causing the rapid sorption of the remaining urea. Later, the moisture was decreased by room temperature air drying to 10.4 percent, based on grain dry weight, at which moisture the equivalent protein content was measured to be 47.70 percent, compared to the calculated value of 50.17 percent.

Examples 4 through 11 clearly illustrate the efficacy of sorption of large amounts of urea into various intact whole cereal grains. In each of these examples the grain moisture was increased from "as is" to 20 percent with a tempered weight of 166.7 grams, 133.3 grams of which was dry matter. Water disappearance into the various grains took place in less than 10 minutes, but six hours was allowed for water distribution prior to addition of the urea. In each case 25 grams of urea was added to and mixed with the grain. Although the times required for sorption or encapsulation is a conservative estimate, it is apparent that the differences among the various grains is minimal. In each case, much of the urea was sorbed within the first 30 seconds, after which the rate of sorption decreased. After most of the urea was sorbed agitation was stopped, then agitation continued occasionally; in all examples agitation requirements were economical.

After sorption was complete, including ample time for urea translocation within the cereal berry, the grains were dried at 25°C and approximately 50 percent relative humidity. Both calculated and determined equivalent protein content were based on these total solids and final moisture contents, all listed in the table of examples. The levels of total equivalent protein, in Examples 4 through 11, more than fulfill those nitrogen quantity requirements of protein concentrates. Water removal from these grains required less time under conditions used than water removal from nearly harvested high moisture grain.

Examples 12, 13 and 14 show the efficacy in increasing the corn moisture to 18.2 percent, then adding the urea only 2 hours later. The corn samples used in Examples 12 and 14 were from two different lots, but the urea sorption was about the same and both were rapid. Examples 12 and 13, in which corn from the same lot was used, differed only in the amount of urea used, resulting in a greater urea sorption time requirement in Example 13 wherein 25 percent more urea was sorbed, compared to that in Example 12 (25 grams versus 20 grams). The three samples were air dried at room temperature of 50 percent relative humidity. The total equivalent protein contents as determined approximated the calculated values and satisfied the nitrogen requirements for a nitrogen concentrate suitable for a ruminant feed.

In Example 15, 2.0184 pounds of 97 percent purity animal feed grade urea, ground to particle size less than 450 microns, was mixed with and sorbed by 202.324 pounds of grain sorghum containing 14.0 percent moisture, increased from 12.9 percent moisture only five minutes earlier to ensure kernel peripheries free of liquid water but to protect against uniform water sorption. Less than 2 minutes was required for disappearance of the added water. Sorption of urea was very rapid but was retarded somewhat by the time required to work out the urea lumps, formed after grinding, by mixing with the grain. After urea sorption the grain was "micronized" by the procedure described above, having been heated by an infrared source to an extent just short of popping, followed immediately by rolling. The equivalent protein content was measured and calculated to be 12.76 and 12.76 percent, respectively based on the final moisture content of eight percent.

Roughage and mineral supplement was mixed with the micronized flakes so that the finished ration was 90 percent grain, then fed to a steer for 80 days. All nitrogen in excess of that from the natural protein was furnished by the urea sorbed into the grain. During the trial, no palatability problems were detected and the calf added weight at approximately the same rate and efficiency as that of the control in which the urea was handmixed with the ration, otherwise identical. In control ration, wherein "micronized" grain sorghum was simply mixed with urea, application of crystalline urea was nonuniform with a constant tendency to separate and stratify, due to the differences in ration particle size and shape.

A part of the urea treated whole grain in Example 15 was reserved, prior to infra red treatment, and divided into two portions, one of which was soaked in water for 15 minutes, then dried to its previous moisture content. Both the soaked and unsoaked samples were then ground in preparation for analyses. Both portions were analyzed for NPN content by the A.O.A.C. method described, and for total equivalent protein content by the Kjeldahl method. Protein content for the unsoaked portion was 11.99 percent, compared to the calculated value of 11.93 percent, and 2.10 percent equivalent protein from urea nitrogen. The soaked and dried sample contained 11.22 percent total equivalent protein, but only 0.55 percent apparent protein from the NPN of urea. Thus, it was apparent that most of the urea sorbed by the whole seed tissues was not removed by simple elutriation. Furthermore, the results clearly indicate that the added urea nitrogen appears as protein nitrogen rather than as nonprotein nitrogen from urea, which is susceptible to hydrolysis from the urease used in the determination. It is apparent, then, that there was a significantly decreased NPN release, due to location within the tissue structure, and the rate of NPN availability was decreased further due to apparent condensation of the urea.

For optimum results the size of the urea particles used in the process should not exceed 450 microns or —40 mesh.

The increase in moisture content of the whole grain required from addition of water during the process is preferably between about 14 to 25 percent. The preferred amount of urea to be added to the grain by the process varies up to about 20 percent based on the dry grain weight, and the optimum operation of the process results in a ratio of added water to urea sorbed by the grain varying from about 3:1 to about 1:3. The process is preferably operated to provide a maximum total equivalent protein content in the grain up to about 58 percent based on the grain product dry weight.

From the foregoing discussion and examples it is evident that a novel and simple method has been provided by the present invention to sorb urea into the tissue structure of whole cereal grains, predicated on the discovery that whole cereal kernels, containing moisture in excess of that maximum tolerated for storeability, causes the sorption of powdered crystalline urea. Such urea sorption has been shown to be permanent in whole kernels and precludes resolution of the urea and whole cereal grain components. Further, by the method of the present invention, a whole grain product may be produced suitable for the heat type processes currently in use by most of the major cattle feeders.

It has been shown that any amount of urea may be sorbed by the whole cereal kernels up to and including that amount required to produce a product with at least as much as a protein level equivalent to an oilseed protein concentrate. Of fundamental importance is economy, flexibility and simplicity inherent in the process to enable the processor to operate in all areas where grain is grown, stored or consumed, and fits with all current methods of grain accumulation and transportation in use.

It is to be understood that this invention is not limited to exact embodiments of the methods and various apparatus shown or described, which are merely by way of illustration and not limitation, as various changes may be made therein which are within the spirit of the invention and scope of the claims; it is, therefore, intended that claims cover all such claims and modifications.

What is claimed is:

1. A method for supplementing the natural protein content of whole feed grains to produce a grain having a total equivalent protein content up to about 58 percent which comprises:
   a. contacting the raw whole feed grains with water to provide a moisture content in the grain from about 14 to 25 percent by weight;
   b. contacting the treated grain of step (a) with urea in amounts up to about 20 percent based on the dry grain weight, the particles of urea being smaller than about 450 microns by at least two dimensions; and
   c. maintaining contact of urea and whole grain until the urea has been sorbed by the grain;
   whereby a whole grain product is produced capable of being converted by the animal's digestive system to provide up to 58 percent protein based on the original dry grain weight.

2. The method of claim 1 in which urea is added in amounts up to about 20 percent, based on the grain dry weight.

3. The method of claim 1 in which the ratio of water added to urea sorbed varies from about 3:1 to about 1:3.

4. The method of claim 1 in which the total equivalent protein content of the grain is increased up to about 58 percent, based on the grain product dry weight.

5. The method of claim 1 including the step of rapidly heating the urea sorbed grain to condense the sorbed urea with the whole seed tissues.

* * * * *